R. A. WILLIAMS.
GUIDING MEANS FOR TRACTION ENGINES.
APPLICATION FILED JULY 13, 1915.
1,167,459.
Patented Jan. 11, 1916.
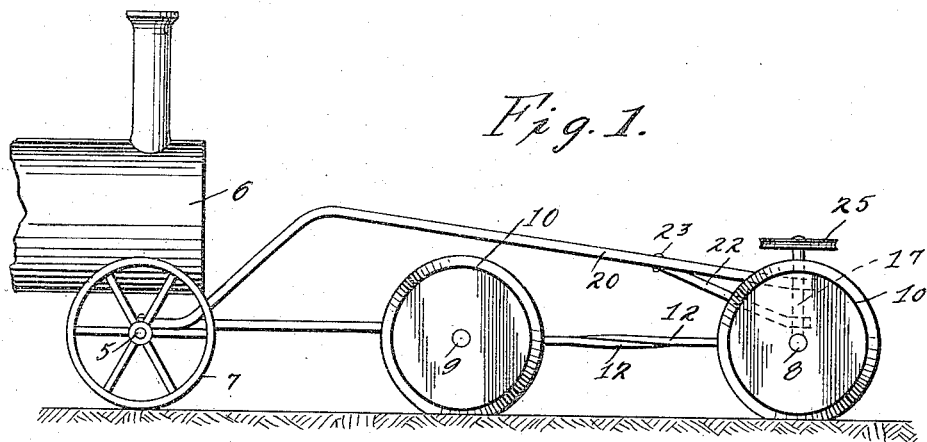
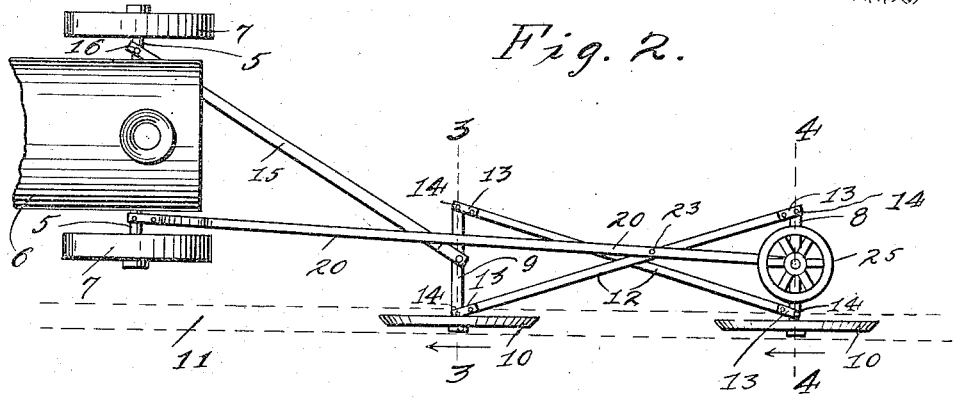
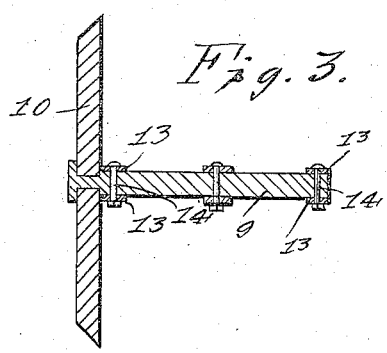
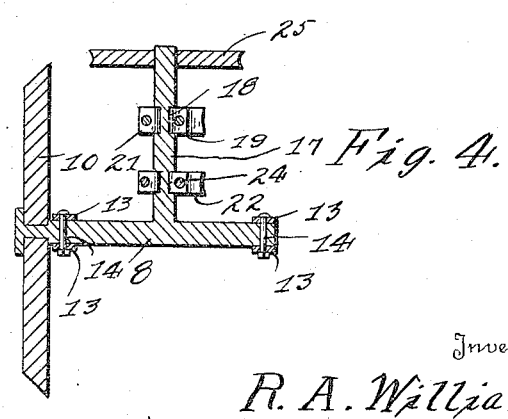
Inventor
R. A. Williams.
Witnesses
By
Attorneys.

UNITED STATES PATENT OFFICE.

ROY A. WILLIAMS, OF DESLACS, NORTH DAKOTA.

GUIDING MEANS FOR TRACTION-ENGINES.

1,167,459.  Specification of Letters Patent.  Patented Jan. 11, 1916.

Application filed July 13, 1915. Serial No. 39,650.

*To all whom it may concern:*

Be it known that I, ROY A. WILLIAMS, a citizen of the United States, residing at Deslacs, in the county of Ward, State of North Dakota, have invented certain new and useful Improvements in Guiding Means for Traction-Engines; and I do hereby declare the following to be a full, clear, and exact description of the invention, such as will enable others skilled in the art to which it appertains to make and use the same.

This invention relates to new and useful improvements in guiding means for traction engines employed in plowing whereby the engine is held in a parallel course to a furrow previously made.

It is the object of the present invention to generally improve the structure and the efficiency of guiding means of this class, and it is more specifically an object to provide such a guiding means which may be readily steered from the engine as desired.

It is further an object to provide such an engine guide which is exceedingly simple in structure and which may be very readily associated with traction engines of various types.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a side elevation of the forward portion of a traction engine, showing the improved steering mechanism attached thereto. Fig. 2 is a top plan view of the structure shown in Fig. 1. Fig. 3 is a sectional view taken transversely through the rear axle of the steering mechanism, on the line 3—3 of Fig. 2. Fig. 4 is a detail sectional view on the line 4—4 of Fig. 2.

Referring now more particularly to the accompanying drawings 5 designates conventionally the front steering axle of the traction engine 6, which carries the ground wheels 7.

The improved steering mechanism for this traction engine comprises a truck formed of the front and rear axles 8 and 9 respectively which carry at their outer ends the ground wheels 10 which are adapted to ride in the furrow by which it is desired to guide the engine, the furrow being designated at 11. These axles are connected by diagonal cross rods 12 which have their ends connected to respective end portions by a pair of plates 13 secured to opposite sides of each end with a pivot pin 14 passed through said ends and through the adjacent axle end. The rear axle 9 is connected to that end of the steering axle 5 of the engine farthest from the truck by a link 15 pivoted thereto and pivotally connected to the central portion of the axle by a pin 16, it being understood that the truck is disposed forwardly of and to one side of the engine. For connecting the adjacent end of the axle 5 to the truck a standard 17 is provided centrally on the front axle 8 and this standard is provided with a circumscribing groove 18 to which is secured a bearing 19 formed on the forward end of a link 20 which is pivotally connected to the adjacent end of the engine axle, this bearing preferably comprising a bowed member 21 bolted to the bowed end of the link whereby the device may be readily disassembled as desired. A brace 22 is provided for the forward end of the bar 20, which has its rear end secured at 23 to the intermediate portion of the bar and which has its other end pivotally secured at 24 to the lower portion of the standard.

An exceedingly simple and efficient means has thus been provided whereby the engine may be guided to hold its course parallel to the furrow. To provide for manually guiding the engine by means of the truck, as desired, a steering wheel 25 is secured on the upper end of the standard and on it may be wound a suitable cable which may extend to the engine.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention as claimed.

What I claim is:—

1. A guiding means comprising a pair of axles, a furrow wheel carried by the outer end of each axle, bars pivotally connecting the end portions of the axles, a link pivoted to the rear axle and adapted to be pivoted to one end of the axle of an engine and a second link pivoted to the front axle and adapted to be pivoted to the other end of the engine axle.

2. A guiding means comprising a pair of axles, a furrow wheel carried by the outer end of each axle, bars pivotally connecting the end portions of the axles, a standard provided centrally on one of the axles, controlling means carried by the standard, a link pivoted to one of the axles at its center and adapted to be pivoted to one end of an engine axle and a second link pivoted to the standard and adapted to be pivoted to the other end of the engine axle.

In testimony whereof, I affix my signature, in the presence of two witnesses.

ROY A. WILLIAMS.

Witnesses:
A. C. TORGERSON,
FINN OGEN.

Copies of this patent may be obtained for five cents each, by addressing the "Commissioner of Patents, Washington, D. C."